(12) United States Patent
Losehand

(10) Patent No.: US 9,815,989 B2
(45) Date of Patent: Nov. 14, 2017

(54) COATING MATERIAL WITH FIREPROOFING PROPERTIES

(71) Applicant: STROHLOS PRODUKTENTWICKLUNG GMBH, Waren/Mueritz (DE)

(72) Inventor: Christian Losehand, Waren/Mueritz (DE)

(73) Assignee: Strohlos Produktentwicklung GmbH, Waren/Mueritz (DE)

( * ) Notice: Subject to any disclaimer, the term of this patent is extended or adjusted under 35 U.S.C. 154(b) by 0 days.

(21) Appl. No.: 15/102,080

(22) PCT Filed: Dec. 3, 2014

(86) PCT No.: PCT/EP2014/076454
§ 371 (c)(1),
(2) Date: Jul. 7, 2016

(87) PCT Pub. No.: WO2015/082561
PCT Pub. Date: Jun. 11, 2015

(65) Prior Publication Data
US 2016/0304726 A1    Oct. 20, 2016

(30) Foreign Application Priority Data
Dec. 4, 2013    (DE) .................. 10 2013 113 463

(51) Int. Cl.
*C09D 5/18*    (2006.01)
*C09D 7/12*    (2006.01)
*C08K 3/00*    (2006.01)
*C08K 5/00*    (2006.01)
*C08K 3/22*    (2006.01)

(52) U.S. Cl.
CPC ............... *C09D 5/18* (2013.01); *C09D 7/125* (2013.01); *C09D 7/1216* (2013.01); *C08K 3/0058* (2013.01); *C08K 5/0066* (2013.01); *C08K 2003/2206* (2013.01)

(58) Field of Classification Search
CPC ........ C09D 5/18; C09D 7/1216; C09D 7/125; C08K 3/0058; C08K 5/0066; C08K 2003/2206
See application file for complete search history.

(56) References Cited

U.S. PATENT DOCUMENTS

2003/0054103 A1    3/2003    Sato et al.

FOREIGN PATENT DOCUMENTS

| DE | 101 23 584 | 11/2002 |
| EP | 1 547 739 | 6/2005 |
| WO | WO-2004/016712 | 2/2004 |

*Primary Examiner* — Anthony J Green
(74) *Attorney, Agent, or Firm* — Muncy, Geissler, Olds & Lowe, P.C.

(57) ABSTRACT

A coating substance having fireproofing properties includes a coating substance with an addition made of extracts of Urticaceae, extracts of plants from the hemp family and alkaline earth metal oxides. The coating substance can be a powder for powder coating or a wet paint or a comparable coating substance which fire properties are improved by the addition. A nettle extract is preferably selected as the extract of the Urticaceae family.

9 Claims, No Drawings

COATING MATERIAL WITH FIREPROOFING PROPERTIES

BACKGROUND OF THE INVENTION

The invention relates to a coating substance having fireproofing properties, which can be used to coat various surfaces.

It is known to coat a wide variety of materials with coating substances. For example, a person skilled in the art knows powders, wet paints, and similar substances. Many technical devices, as well as metal components of pieces of furniture or pieces of metal furniture are provided with a coating to improve various properties, such as the durability. Other materials have also become known, which can be coated with a corresponding layer, such as wooden or straw panels. Powder is usually based on epoxy or polyester resins; paints comprise solvents, resins and/or acrylates, in addition to pigments, and other additives.

The drawback of the coating according to the prior art, however, is that the coating agents begin to smolder under the action of heat, in particular, with flame impingement, at temperatures as low as 750° C. to 800° C. Powder ignites, for example, at even higher temperatures, creating an open flame. The powder consequently becomes charred and rolls off. In the worst case, it is even possible for other objects to catch fire. This property is undesirable, of course, especially in sensitive areas with respect to fire protection.

However, even when materials having good fireproofing properties are used, more easily flammable coating substances are not suited if these materials are to be given a powder coating so as to improve the durability, or so as to improve the appearance by way of a coating.

SUMMARY OF THE INVENTION

It is therefore the object of the invention to provide a coating substance for coating, which has good fireproofing properties, and in particular is not flammable when exposed to high heat.

According to the invention, this object is achieved by supplementing the resin- and/or acrylate-based coating substance having fireproofing properties with an addition that brings about fireproofing properties. This addition is a mixture of nettle extract, hemp extract, and calcium oxide. However, it is also possible to use extracts of other Urticaceae or other plants from the hemp family. The use of other alkaline earth metal oxides is also possible.

DESCRIPTION OF THE PREFERRED EMBODIMENTS

The scope of the addition can encompass 20 to 50 percent of the total volume of the coating substance having fireproofing properties. To ensure that coating by way of this coating substance having fireproofing properties remains possible, the proportion of the addition should not exceed a value of 50 percent. Conversely, if the addition accounts for less than 20 percent of the coating substance having fireproofing properties, it will not be ensured that a flame acting on the coating will not cause ignition. In practical experience, mixtures made of 55 to 70% conventional coating substance and 45 to 30% addition have been found to be effective.

To ensure fireproofing properties, the above-described addition should also be compounded with a certain mixing ratio. The proportion of extracts made from rapidly renewable plants, which is to say the nettle plants and plants from the hemp family, determines the overall mixture since the extracts account for 80 to 98 percent of ingredients. In contrast, the alkaline earth metal oxide provides only 2 to 20% of the addition.

The mixture of extracts is approximately four parts nettle extract to one part hop extract. However, minor shifts toward a mixing ratio of from three to one to five to one, are also possible here. This should be made dependent on what further processing options are predefined.

Since the above coating substance having fireproofing properties described in detail is an exemplary embodiment, this can be modified by a person skilled in the art in the customary manner within a broad range without departing from the scope of the invention. It is conceivable, for example, to also use extracts of other annually growing plants instead of the extracts made of Urticaceae and plants from the hemp family, such as grain straw or maize straw, bamboo straw, sugar cane straw and the like. In particular, it is also possible for mixtures made of different extracts of Urticaceae and mixtures made of extracts of different plants from the hemp family to take the place of the described extracts. Likewise, the coating substance having fireproofing properties can also include a mixture of different alkaline earth metal oxides. Moreover, the use of the indefinite articles "a" or "an" does not preclude the features in question from being present multiple times.

The invention claimed is:

1. A coating substance having fireproofing properties comprising a first coating substance for coating and an addition made of extracts of Urticaceae, extracts of plants from the hemp family and alkaline earth metal oxides.

2. The coating substance having fireproofing properties according to claim 1, having a mixing ratio of 55 to 70 vol. percent of the first coating substance for coating and 30 to 45 vol. percent of the addition.

3. A coating substance having fireproofing properties according to claim 1, wherein the addition has a mixing ratio of 2 to 20 vol. percent alkaline earth metal oxide and 80 to 98 vol. percent extracts of Urticaceae and plants from the hemp family.

4. The coating substance having fireproofing properties according to claim 3, wherein in the addition one part extract made of plants from the hemp family is present for every three to five parts of extracts made of Urticaceae.

5. A coating substance having fireproofing properties according to claim 1, wherein the alkaline earth metal oxide is calcium oxide.

6. A coating substance having fireproofing properties according to claim 1, wherein the extract made of Urticaceae is nettle extract.

7. A coating substance having fireproofing properties according to claim 1, wherein the extract made of plants from the hemp family is hemp extract.

8. A coating substance having fireproofing properties according to claim 1, wherein the first coating substance is a powder.

9. A coating substance having fireproofing properties according to claim 1, wherein the coating substance is a wet paint.

* * * * *